United States Patent [19]

Berwick, Jr. et al.

[11] 4,347,572
[45] Aug. 31, 1982

[54] METHOD AND APPARATUS FOR AN AIRCRAFT CLIMB-OUT GUIDANCE SYSTEM

[75] Inventors: James W. Berwick, Jr., Seattle; Robert J. Bleeg, Mercer Island; Vincent E. McFaddin, Renton, all of Wash.

[73] Assignee: The Boeing Company, Seattle, Wash.

[21] Appl. No.: 90,812

[22] Filed: Nov. 2, 1979

[51] Int. Cl.³ .................. G06F 15/50; G06G 7/78
[52] U.S. Cl. .................. 364/433; 364/427; 364/435; 244/181; 244/182
[58] Field of Search ............ 364/427, 428, 433, 435; 340/27 SS; 244/180, 181, 182; 73/178 T

[56] References Cited

U.S. PATENT DOCUMENTS

| | | | |
|---|---|---|---|
| 3,241,792 | 3/1966 | Hattendorf | 244/182 |
| 3,522,729 | 8/1970 | Miller | 244/182 |
| 3,662,976 | 5/1972 | Gesler | 244/182 |
| 3,681,580 | 8/1972 | Gwathmey et al. | 364/434 |
| 3,691,356 | 9/1972 | Miller | 244/182 |
| 3,774,017 | 11/1973 | Zagalsky | 244/182 |
| 3,814,912 | 6/1974 | Manke et al. | 244/181 |
| 3,822,047 | 7/1974 | Schuldt, Jr. | 364/427 |
| 3,837,603 | 9/1974 | Schultz et al. | 364/427 |
| 3,908,934 | 9/1975 | Schloeman | 244/182 |
| 3,925,640 | 12/1975 | Duggan | 244/195 |
| 3,963,197 | 6/1976 | Oberlerchner | 244/181 |
| 4,027,839 | 6/1977 | Quinlivan | 244/195 |
| 4,044,975 | 8/1977 | Blechen et al. | 364/435 |
| 4,071,893 | 1/1978 | Sicre | 244/181 |
| 4,093,158 | 6/1978 | Clews et al. | 244/182 |
| 4,189,118 | 2/1980 | Peter-Contesse | 244/182 |

*Primary Examiner*—Jerry Smith
*Attorney, Agent, or Firm*—James P. Hamley; Bernard A. Donahue

[57] ABSTRACT

An aircraft guidance system operable during both take-off and go-around maneuvers allows safe operation even under adverse wind shear conditions. Initially the system controls vertical speed to achieve an acceptable, minimum climb rate regardless of airspeed loss. Should excess thrust exist such that the acceptable minimum climb rate is exceeded, increased vertical speed and airspeed are commanded. When the climb rate significantly exceeds the acceptable minimum, airspeed is controlled to a specified value. Should the aircraft ever approach the "stick shaker" condition, an override command limits aircraft angle of attack.

12 Claims, 6 Drawing Figures

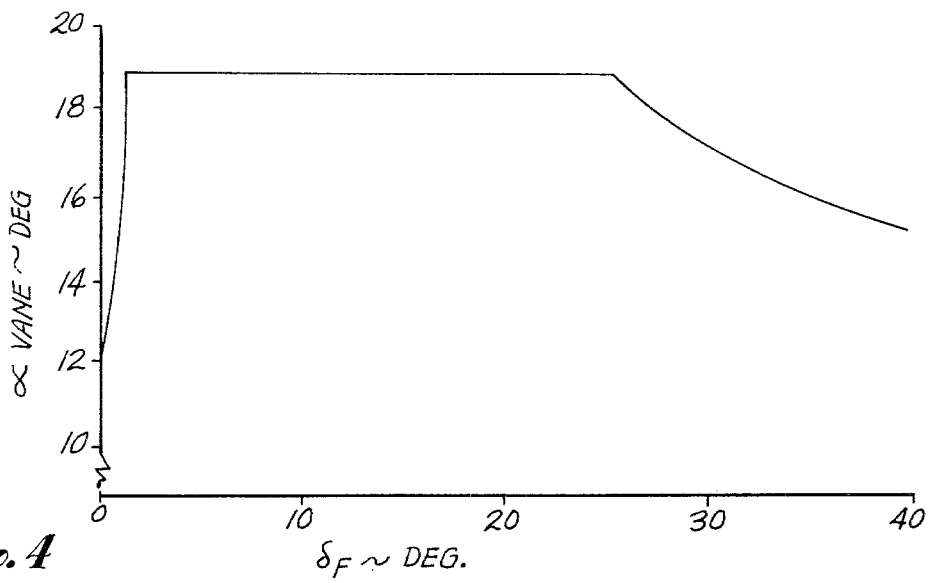
*Fig. 4*
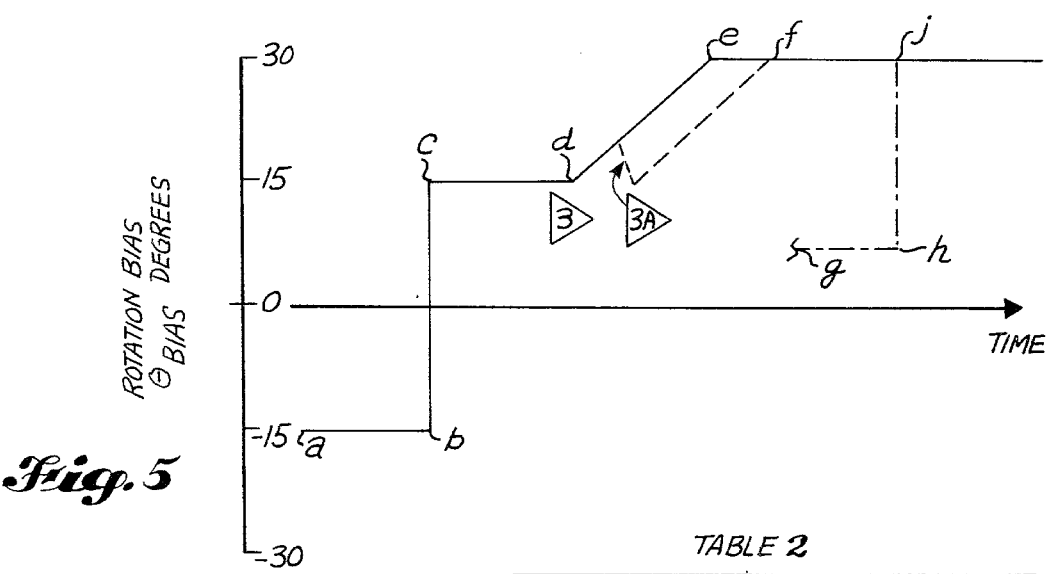
*Fig. 5*
TABLE 1
| FLAP POS | $K_1$ |
|---|---|
| 0° | 4.45 |
| 5° | 4.45 |
| 10° | 4.42 |
| 15° | 4.42 |
| 25° | 4.80 |
| 30° | 5.13 |
| 40° | 3.80 |
TABLE 2
| | | $\alpha\,REF = A + (B \times \delta\,LIM)$ | | | |
|---|---|---|---|---|---|
| FLAP POS | GEAR POS | A | ENG OUT A | B | ENG OUT B |
| 0 | — | 8.0 | 7.0 | 0 | 0 |
| 1 | — | 13.3 | 13.7 | .168 | 0 |
| 2 | — | 13.5 | 14.1 | .160 | 0 |
| 5 | — | 13.0 | 13.6 | .175 | 0 |
| 10 | — | 13.51 | 13.8 | .190 | 0 |
| 15 | UP | 12.25 | 13.2 | .177 | 0 |
| 15 | DOWN | 13.0 | 13.7 | .160 | 0 |
| 25 | UP | 11.1 | 12.2 | .180 | 0 |
| 25 | DOWN | 11.1 | 12.2 | .150 | 0 |
| 30 | — | 9.2 | 9.2 | .150 | 0 |
| 40 | — | 7.3 | 7.3 | .150 | 0 |
TABLE 3
| FLAP POS | $K\alpha$ | ENG. OUT $K\alpha$ |
|---|---|---|
| UP | 1.6 | 1.9 |
| NOT UP | 1.0 | 0.7 |
*Fig. 6*

METHOD AND APPARATUS FOR AN AIRCRAFT CLIMB-OUT GUIDANCE SYSTEM

BACKGROUND OF THE INVENTION

The present invention pertains to the aircraft control art and, more particularly, to an aircraft climb-out guidance system.

Investigations have shown that several aircraft accidents have been caused by severe wind shear conditions encountered during takeoff and landing operations. Analysis has shown that the aircraft has sufficient performance capability to avoid most, if not all, of these adverse wind shear conditions. The problem has been, basically, one of the flight crew not utilizing the aircrafts performance capabilities in such a manner that the problem can be avoided.

One prior art approach to the wind shear problem has been the use of a wind shear warning device. Here, sensors on the aircraft are processed and the crew is warned if a wind shear condition exists. While helpful, such devices cannot be expected to completely eliminate wind shear accidents due to the aforementioned fact that even though the crew is aware of a wind shear condition, it is not always clear as to what action should be taken.

A further problem with such warning devices is that they are subject to "nuisance" tripping, thereby reducing their credibility.

Systems have been tested, on simulators, which utilize various combined displays of airspeed and groundspeed, thereby giving the pilot sufficient information to enable a landing approach with a high margin of airspeed. Thus if head wind rapidly diminished (adverse wind shear), the aircraft may retain a near normal stall margin and avoid accident. However, these schemes require knowledge of groundspeed and the vast majority of jet transports do not have groundspeed sensors. Such sensors are costly and provide almost no protection for wind shear conditions encountered during takeoff.

Thus, there is a long felt need in this art for a system which guides the aircraft, via either flight director or an autopilot control, safely out of an extreme wind shear condition.

SUMMARY OF THE INVENTION

It is an object of this invention, therefore, to provide a method and apparatus for the climb-out guidance control of an aircraft, particularly under wind shear conditions.

Briefly, according to the invention, the method for determining the climb-out guidance of an aircraft comprises the descending priority steps of: (a) performing controls (b) through (d) below but under no circumstances allowing angle of attack to exceed a predetermined stick shaker value. Step (b) requires controlling vertical speed to achieve a predetermined acceptable, minimum climb rate regardless of air speed loss. Step (c) involves commanding both increased vertical speed and airspeed control in response to aircraft thrust exceeding that needed to achieve an acceptable minimum climb rate. Step (d) requires controlling airspeed to a specified value in response to achieving a climb rate significantly higher than the minimum climb rate.

Apparatus which generates a climb-rate guidance command signal for an aircraft includes a minimum climb rate means which compares the aircraft's actual altitude rate with a minimum reference altitude rate and generates an error command signal in response thereto. Transition rate means produces a predeterminedly increased altitude rate and airspeed command signal in response to the aircraft exceeding the aforementioned minimum reference altitude rate. Final airspeed command means responds to the aircraft exceeding the minimum altitude rate by a significant margin to produce an airspeed command signal indicative of a predetermined specified value. Stick shaker override means produces an overriding command signal for predeterminedly limiting aircraft angle of attack responsive to an aircraft airspeed approaching a stall value.

BRIEF DESCRIPTION OF THE DRAWINGS

FIGS. 2 through 6 provide supplementary details to various blocks shown in FIG. 1.

DETAILED DESCRIPTION OF THE PREFERRED EMBODIMENT OF THE INVENTION

Figure 1:
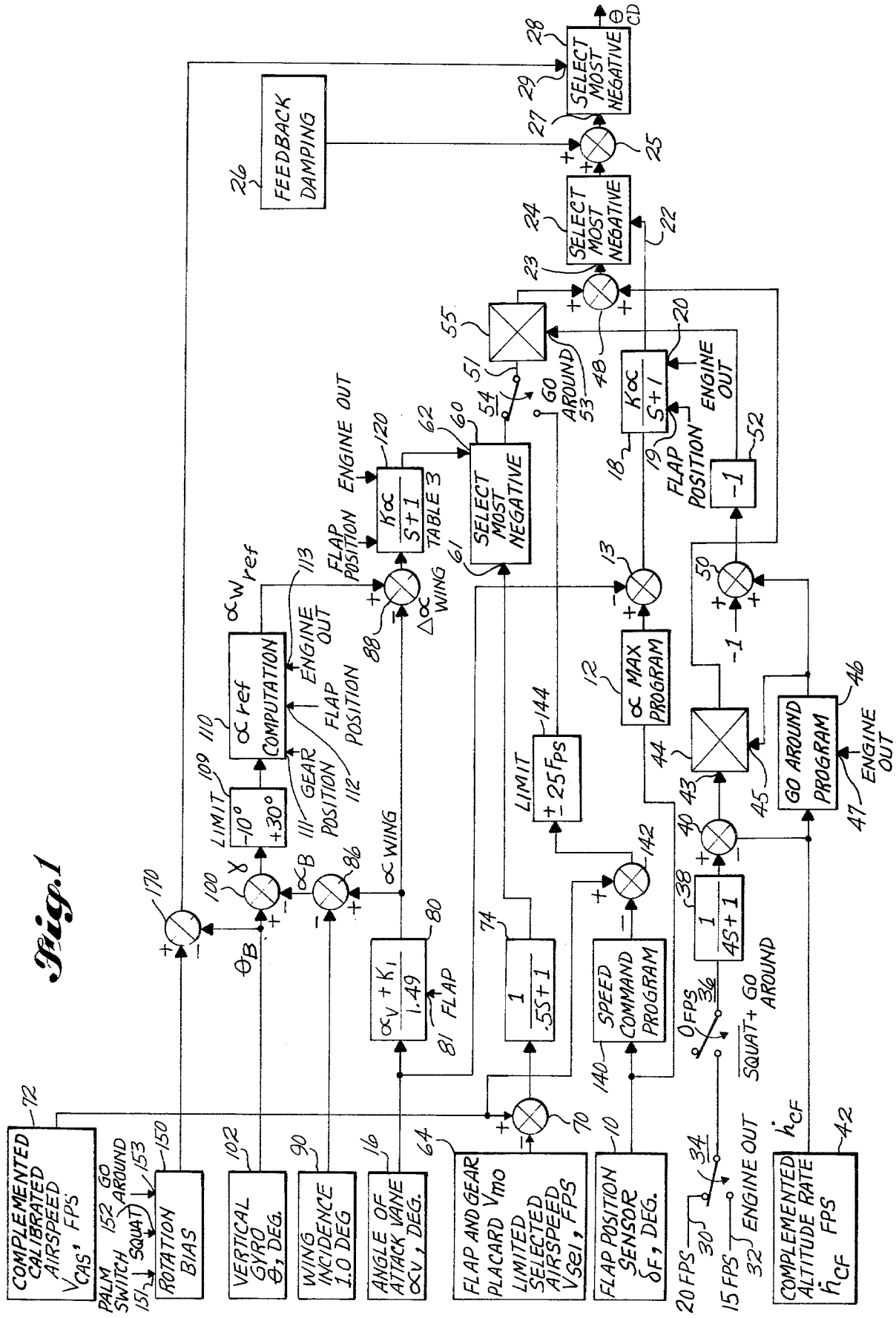
FIG. 1 is a detailed block diagram illustrating the preferred flight director embodiment of the climb-out guidance system according to the invention.

FIG. 1 is a detailed block diagram illustrating the preferred embodiment of the climb-out guidance system according to the invention. The system, as will be described more fully herein below, monitors numerous aircraft parameters and operates in one of several prioritized modes to generate a climb-out guidance determined signal. This signal may be used as a pilot flight director display indicating an appropriate aircraft pitch angle, or it may be directly connected to an auto pilot control thereby providing automatic aircraft guidance.

In its highest priority mode, control of the aircraft is preserved by limiting angle of attack to an appropriate value just below "stick shaker". The stick shaker is an impending stall warning device installed on all jet transports. It automatically activates when angle of attack is at a "never exceed" value corresponding to an airspeed about 10% above stall value.

This portion of the system includes a flap position sensor 10. Flap position sensor 10 produces an output signal $\delta_F$ proportional to the rotation of the flaps in degrees. This output signal is passed to an angle of attack ($\alpha$) program block 12. The transfer characteristic of angle of attack block 12 is shown in FIG. 4. Angle of attack block 12 is essentially a memory which looks up a predetermined maximum angle of attack $\alpha$ for a given flap position $\delta_F$. FIg. 4 illustrates maximum angle of attack at stick shaker minus 1 degree for a Boeing 737–200A type aircraft. Thus, the output from angle of attack block 12 is a signal representative of a maximum allowable angle of attack.

This maximum allowable signal is passed to a summer 13, at its positive input. Passed to the negative input of summer 13 is a signal proportional to the aircraft's actual angle of attack as sensed by an angle of attack vane 16. Thus, the output from summer 13 is an error signal related to the difference between maximum allowable angle of attack for stick shaker consideration and the aircraft's actual angle of attack.

This error output signal is passed through a gain and lag circuit 18. Gain and lag circuit 18 has an input 19 corresponding to flap position and an input 20 corresponding to the condition of an engine being out. Table 3 of FIG. 6 illustrates the gain factor $K\alpha$ for the various input conditions. Thus, for example, if an engine is out and the flaps are up, the value of $K\alpha$ is 1.9. The values of $K\alpha$ are selected in accordance with the particular aircraft being used. The lag factor provided by the gain lag circuit 18 provides display lag such that when the resulting signal is passed to a flight director, for example, the display transition does not occur at an annoyingly quick rate.

The output from network 18 is passed to a first input 22 of a selection circuit 24. This network selects the most negative of the signals at its first input 22 and its second input 23, passing the resultant to its output. As will be understood more fully with respect to the discussion herein below, the signal appearing at the second input 23 is ordinarily more negative than that at the first input 22, whereby this signal is passed to the output and, in general, used to control the flight director display. However, for the condition wherein stick shaker is being approached, a signal at the first input 22 goes more negative whereby this signal is passed to the output of selector circuit 24.

The output from selector circuit 24 appears at the positive input of a summer circuit 25. Also applied to a positive input of summer circuit 25 is the output from a feedback damping circuit 26. Acting in the conventional manner, feedback damping circuit 26 senses parameters within the system and, in a feedback mode, acts to create a signal which dampens the system inner loop operation to eliminate instability. One of ordinary skill in this art would understand the construction and use of feedback damping circuit 26.

The output from summer circuit 25 passes to one input 27 of a second selector circuit 28. This circuit, as with selector circuit 24 selects the most negative of the signals appearing at its first input 27 and second input 29, passing the resultant signal to its output terminal. As will be understood more fully herein below, the output from selector 28 will ordinarily be the signal appearing at its first input 27.

The output from second selector 29 constitutes the output of the system. This signal is proportional to a commanded pitch angle of the aircraft and may be adapted, in the normal manner, either to produce a suitable flight director indicator display for use by the pilot or to directly control an aircraft auto pilot.

In its second priority mode, the system controls vertical speed of the aircraft to achieve an acceptable, minimum climb rate regardless of airspeed loss. The portions of the system which accomplish this function include first and second altitude rate command signals generated at sources indicated at 30, 32, respectively. For the instant system, the altitude rate command signals are either 15, or 20 feet per second. The appropriate one of the two signals is selected by a switch 34. Switch 34 normally selects the 20 feet per second signal. However, for the condition wherein one of the aircraft's engines is out, the switch switches to the 15 feet per second signal.

The signal selected by switch 34 is passed to a switch 36. Switch 36 is normally in a position to select a 0 feet per second signal, thus ignoring that signal selected by switch 34. However, for the condition wherein the aircraft is off the ground in either a takeoff or a go-around condition switch 36 operates to select the signal passed by switch 34. This condition is sensed by a squat switch located in the vicinity of the landing gear. The squat switch produces an output if the landing gear is loaded. Thus, for take off or go-around condition, switch 36 is activated to its second state for a "not" squat or go-around condition.

The signal selected by switch 36 is passed through a display lag circuit 38. Display lag circuit 38 acts in a manner similar to circuit 18 in that it provides a suitable delay to the passed signal such that transitions from approach to go-around is accomplished with a reasonably low height loss.

The output from display lag circuit 38 is applied to the positive input of a summer circuit 40. Applied to the negative input of summer circuit 40 is the output from a complemented altitude rate sensor 42. This sensor, which is commonly available in the aircraft, provides an output signal $n_{CF}$ which is proportional to the aircraft's altitude rate, in feet per second. Thus, the output from summer 40 is an error signal equal to the difference between the commanded altitude rate and the aircraft's actual altitude rate.

This error signal is fed to the input 43 of a multiplier 44. Multiplier 44 multiplies signals at its input 43 by a factor determined by the signal appearing at its gain control input 45. The gain control signal for multiplier 44 is, in turn, determined by the output from a go-around program block 46. The input to block 46 is the output from the complemented altitude rate sensor 42. Also applied as an input to go-around program block 46 is an input 47 which assumes one of two states dependent upon whether or not an engine of the aircraft is out.

Figure 3:
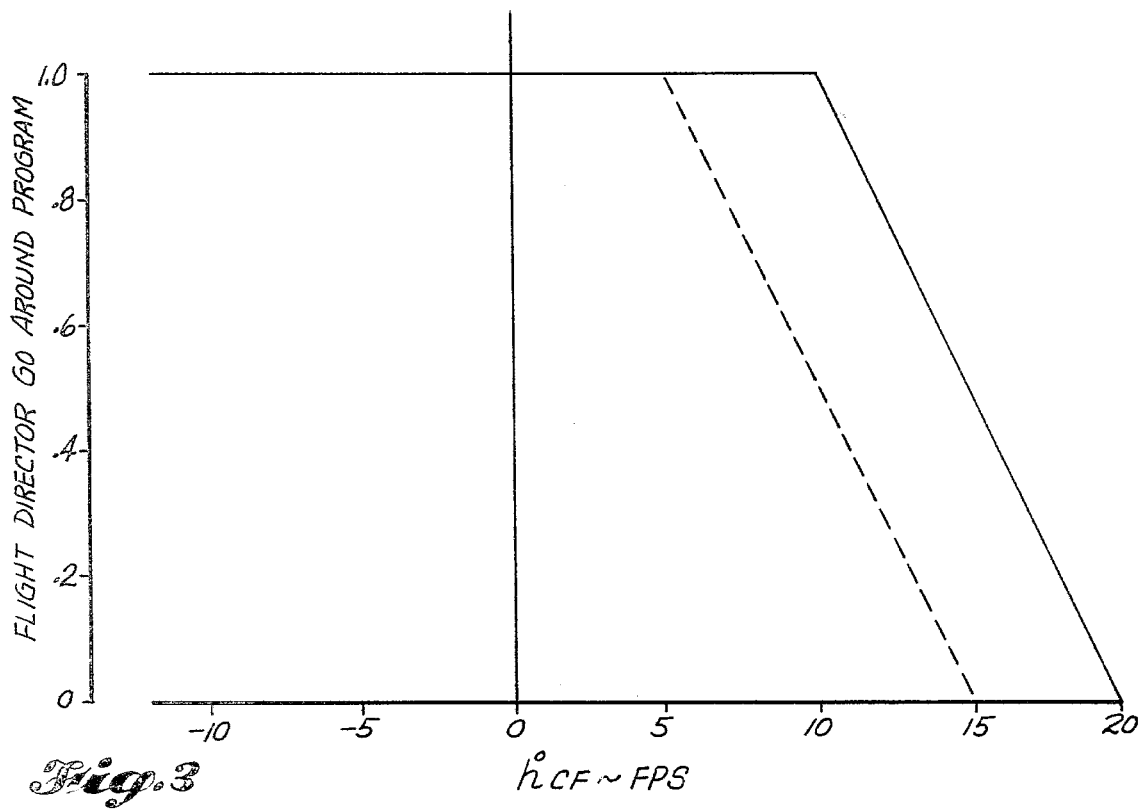

The transfer characteristic of go-around program block 46 is illustrated in FIG. 3. Here, it can be seen that the output signal as plotted on the vertical scale, varies as a function of altitude rates, plotted on the horizontal scale. Thus, for the normal situation in which all engines are operating, the output from go-around program block 46 is at the one level until the altitude rate reaches 10 feet per second. At this point, the output linearly falls to 0 at 20 feet per second. For the condition wherein an engine is out, the output from go-around program block 46 maintains a one level until the aircraft reaches an altitude of 5 feet per second thereby falling to 0 at 15 feet per second.

Referring again to FIG. 1, the gain of multiplier 44 can thus be seen to be a function of the aircraft's altitude rate. For the condition in which the aircraft's altitude rate is below the break values shown in FIG. 3, the error signal out of summer 40 is multiplied by a factor of 1 and passed to the positive input of a summer 48. The output from summer 48 is applied to the second input 23 of the selector circuit 24. As described above, the signal appearing at the second input 23 of selector circuit 24 is, in the absence of a stick shaker condition, passed to the output of selector 24, added with a damping signal via summer 25 and, ordinarily, passed to the second selector circuit 28 as the commanded aircraft pitch angle.

The output from go-around program block 46 is also passed to the positive input of a summer 50. Summer 50 adds to this signal a signal having a value of minus 1, with the output being multiplied by a gain factor of minus 1, via amplifier 52. Thus, whereas the output from the go-around program makes a transition from a value of 1 to 0 for increasing altitude rate, the output from gain block 52 makes a complementary transition from 0 to plus 1. This transitional value is applied to the control input 53 of a multiplier 55 which operates in a manner identical to multiplier 44 in that it multiplies signals appearing at its input 51 by the multiplier dictated at its control input 53. The output from multiplier 52 is applied to the positive input of summer 48 and thus the signal passed to the second input 23 of selector circuit 24, at times the signal out of multipler 44, at times a combination of the signals out of multiplers 44 and 52, and, beyond the point of which the go-around program reaches a 0 value, it is entirely the signal produced by multipler 52. Thus, in this mode of operation, once the aircraft reaches a minimum altitude rate, as determined by the go-around program transfer function of FIG. 3, a transitional mode occurs wherein the output command signal dictates both increased vertical speed and airspeed control, as determined by the input to multiplier 52, discussed herein below. Once the system has reached a climb rate wherein the output from go-around program block 46 reaches 0, the commanded output control signal dictates a desired, controlled airspeed.

The airspeed control is dictated by the input to multiplier 52. This, in turn, is selected by the position of a switch 54. With switch 54 in the position shown, the system is operating in the takeoff only mode. In this mode, the airspeed control signal is selected as the most negative of the signals appearing at the inputs 61, 62 to a selector 60.

The signal appearing at the first input 61 of selector 60 is a pilot's control signal. Thus, the pilot, via a flap and gear placard limited computation 64, selects a desired airspeed $V_{sel}$. His selection is limited over a range defined by an upper limit maximum operating speed $V_{mo}$. This selected value is translated to a proportionate signal which is passed to the negative input of a summer 70. Applied to the positive input of summer 70 is a signal proportional to the aircraft's calibrated airspeed $V_{CAS}$ as generated by a calibrated airspeed sensor 72. Thus, the output from summer 70 is an error signal equal to the difference between the aircraft's actual airspeed and that dictated by the pilot's selection.

The output from summer 70 is passed through a display lag circuit 74 which, in a manner similar to lag circuit 18, controls the rate at which a display change can be affected.

Normally, this pilot selected value will be the most negative input to selector 60 and thus will be passed to control system operation. However, as a safety measure, the present system includes apparatus which assures that a required minimum airspeed be commanded should the value selected by the pilot be too low for existing aircraft conditions.

Here, the output produced by the angle of attack vane 16 is passed through a network 80. Network 80 adds to the aircraft's angle of attack a constant $K_1$ which is a function of flap position at input 81 and which is determined by table 1 of FIG. 6. In turn, the angle of attack $\alpha_v$ plus the constant $K_1$ is divided by a factor 1.49 which is a function of the particular aircraft being controlled. The resulting output from network 80 is a signal representative of the craft's actual angle of attack. This is applied both to the positive input of a summer 86 and to the negative input of a summer 88.

In many aircraft, the wing is at an angle with respect to the fuselage. To correct for this, a fixed wing incidence offset signal is generated at a source 90 and applied to the negative input of summer 86. Thus the output from summer 86 is a signal $\alpha_B$ which is representative of the aircraft fuselage, or body angle of attack. This signal is fed to the negative input of a summer 100. Applied to the positive input of summer 100 is a signal $\theta_B$ generated by a vertical gyro 102. Operating in the known manner, the vertical gyro 102 produces a signal representative of the angle of the aircraft body with respect to a horizontal plane.

The output from the summer 100 is, thus, the difference between the vertical gyro signal $\theta_B$ and the body angle of attack $\alpha_B$. This, by definition, is the flight path angle $\gamma$ through the air mass.

The flight path angle $\gamma$ is passed through a network 109 which limits the flight path angle signal $\gamma$ to upper and lower limits, here, minus 10° and plus 30°, respectively.

The flight path angle signal is then passed to a computer 110. Computer 110 has a series of inputs 111–113 which, as shown, sense gear position, flap position and an engine out condition, respectively. The transfer characteristic of computer 110 is derived from table 2 of FIG. 6. Thus, for the various possible conditions of inputs 111–113 the computer 110, according to the equation shown in table 2, calculates a reference angle of attack $\alpha_{REF}$. The equation shown in table 2 of FIG. 6, and the values of the factors contained in the table are derived from the characteristics of the aircraft to be controlled.

Thus, summer 88 compares the actual angle of attack of the wing of the aircraft with a reference level, thereby producing a difference error signal $\delta\alpha_{wing}$ at its output.

The $\delta\alpha_{wing}$ signal is passed through a network 120 having a gain factor and lag characteristic identical to that of network 18. By selecting the proper factors for computer 110, the signal appearing at the second input 62 of selector 60 will be more negative than that of the first input 61 for the condition wherein the airspeed selected by the pilot is less than a desired minimum value.

Figure 2:
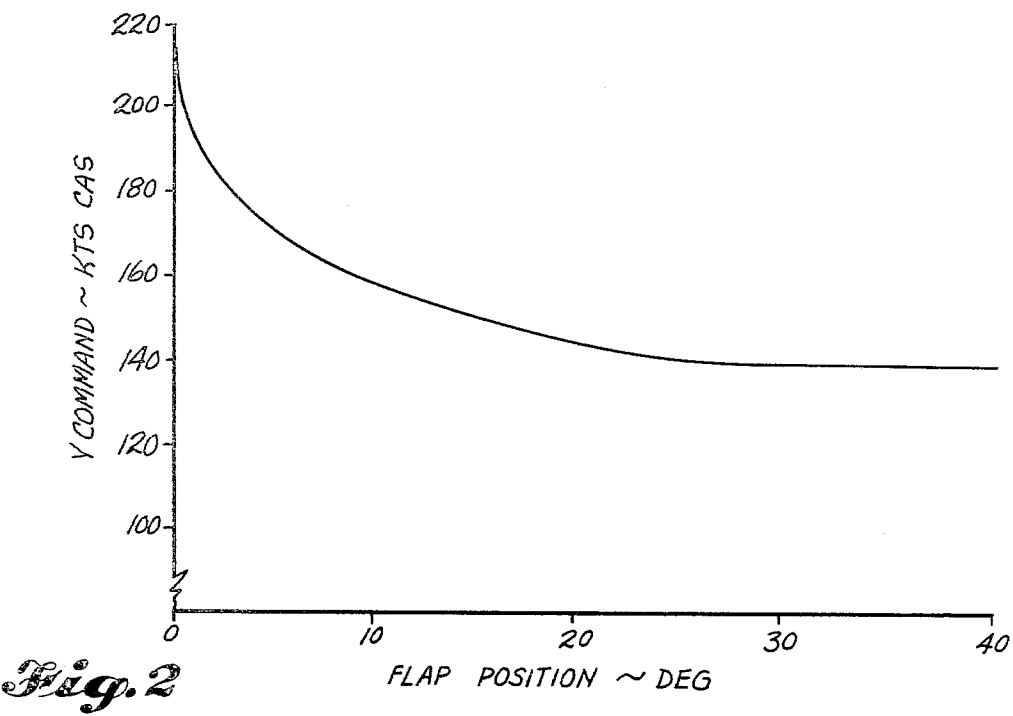

Switch 54 is set to its alternate position in the event that the plane is in a go-around condition. In this mode, the commanded airspeed signal is a function of flap position as is understood as follows. The output signal $\delta_F$ from flap position synchro 10 is routed to a speed command program block 140. The transfer characteristic of speed command program 140 is shown in FIG. 2. Here, a commanded speed is plotted as a function of flap position. The transfer characteristic of 140 is determined as a function of the particular aircraft being controlled.

The output from speed command program block 140 is passed to the negative input of a summer 142. Applied to the positive input of summer 142 is the actual airspeed $V_{CAS}$ from complemented calibrated airspeed sensor 72. Thus the output from summer 142 is an error signal equal to the difference between actual and flap referenced airspeed.

The error signal is limited to plus or minus 25 feet per second by a limit circuit 144 and thereafter passed to a terminal of switch 54. Thus, in the go-around mode, with switch 54 in the go-around position, the airspeed, as selected through multiplier 52 and applied to summer 46 is dictated via flap position.

Normally the second selector circuit 28 passes the signal appearing at its first input 27 as the output commanded aircraft pitch angle $\theta_{CD}$. However, a special rotation bias system 150 controls the commanded pitch angle under certain circumstances. Applied to the input of the rotation bias system 150 is a palm switch input 151, controlled by the pilot during go-around or takeoff maneuvers, the output from the squat switch at input 152 and a go-around command at an input 153. The transfer characteristic of the rotation bias system is illustrated in FIG. 5. The portion of the curve between points a and b represents an aircraft during takeoff wherein the aircraft speed is less than 60 knots. At this point, a rotation bias of minus 15° pitch is generated. Once the aircraft reaches 60 knots, the generated output jumps to point c at a plus 15° pitch. This continues until such time that liftoff occurs at point d. Now, the pitch angle linearly increases at a rate of 3° per second to a maximum of 30°, at point e. Should, upon liftoff, the aircraft touch down again, at point f, the indication ramps to 15° at 6° per second, rising to the 30° maximum at the 3° per second rate. For the go-around condition, the aircraft begins at some commanded pitch angle, here at point g and, once the palm switch for go-around operation is activated, at point h the indication immediately rises at point j to the 30° level.

Referring again to FIG. 1, the output from the rotation bias system 150 is applied to the positive input of a summer 170. Applied to the negative input of summer 170 is the output $\theta_B$ of the vertical gyro 102. Thus, the difference between these two signals is an error signal which is coupled to the second input 29 of the second selector 28. In this manner, the rotation bias system 150 provides the pilot with a clear indication that the system is operating both during takeoff and during the instance of a go-around maneuver command.

In summary, an improved aircraft climb-out guidance system has been described in detail. Many modifications and variations thereto are possible which do not depart from the true spirit and scope of the invention.

We claim:

1. A method for determining the climb-out guidance of an aircraft comprising the descending priority steps of:
   (a) performing controls (b) through (d) below but under no circumstances allowing aircraft angle of attack to exceed a predetermined stick shaker value;
   (b) controlling vertical speed to achieve a predetermined acceptable, minimum climb rate regardless of airspeed loss;
   (c) commanding both increased vertical speed and airspeed control in response to excess thrust upon exceeding said acceptable minimum climb rate; and
   (d) controlling airspeed to a specified value in response to achieving a climb rate significantly higher than said minimum climb rate.

2. The method of claim 1 wherein step (d) comprises the further step of:
   specifying an airspeed value based upon:
      (i) a pilot selected value;
      (ii) a predetermined function of flap position; or
      (iii) an externally programmed value.

3. The method of either of claims 1 or 2 including the further step of:
   (e) displaying said determined climb-out guidance on a suitable display.

4. The method of either of claims 1 or 2 including the further step of:
   (e) controlling a provided aircraft autopilot with said determined climb-out guidance.

5. Apparatus for generating a climb-out guidance command signal for an aircraft comprising:
   minimum means for comparing the aircraft's actual altitude rate with a minimum reference altitude rate and generating an error command signal in response thereto;
   transition rate means for producing a predeterminedly increased altitude rate and airspeed command signal in response to the aircraft exceeding said minimum reference altitude rate;
   final airspeed command means responsive to the aircraft exceeding said minimum altitude rate by a significant margin to produce an airspeed command signal indicative of a predetermined specified value; and
   stick shaker override means producing an overriding command signal for predeterminedly limiting aircraft angle of attack responsive to an aircraft airspeed approaching a stall value.

6. The apparatus of claim 5 wherein the minimum means minimum reference level is a function of the number of operating engines on the aircraft.

7. The apparatus of claim 5 wherein the transition rate means further comprises means for generating said increased altitude rate and airspeed command signal at a predetermined linear rate.

8. The apparatus of claim 5 wherein the final airspeed command means includes means operable during go-around operation of the aircraft to compare actual aircraft airspeed with a desired value based on flap position and produce an error command signal in response to said comparison.

9. The apparatus of claim 5 wherein the final airspeed command means includes means operable during take-off of the aircraft to produce an airspeed command signal responsive to a pilot selected value.

10. The apparatus of claim 9 wherein said final airspeed means further comprises means to compute a minimum desired airspeed value based on predetermined aircraft related parameters and override said pilot selected value should said pilot selected value be less than said minimum desired value.

11. The apparatus of claim 5 further including means for adapting said command signals such that they are suitable for display on an attitude director indicator.

12. The apparatus of claim 5 further including means for adapting said command signals such that they are suitable for controlling an aircraft automatic pilot.

* * * * *